(12) United States Patent
Wu et al.

(10) Patent No.: US 12,722,084 B2
(45) Date of Patent: Sep. 1, 2026

(54) GAME CONTROL METHOD AND APPARATUS

(71) Applicant: NETEASE (HANGZHOU) NETWORK CO., LTD., Hangzhou (CN)

(72) Inventors: Xiao Wu, Hangzhou (CN); Kui Jin, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 275 days.

(21) Appl. No.: 18/709,831

(22) PCT Filed: Oct. 27, 2022

(86) PCT No.: PCT/CN2022/127890

§ 371 (c)(1),
(2) Date: May 14, 2024

(87) PCT Pub. No.: WO2023/109328

PCT Pub. Date: Jun. 22, 2023

(65) Prior Publication Data

US 2025/0001303 A1 Jan. 2, 2025

(30) Foreign Application Priority Data

Dec. 16, 2021 (CN) ......................... 202111546390.9

(51) Int. Cl.
*A63F 13/56* (2014.01)
*A63F 13/533* (2014.01)

(52) U.S. Cl.
CPC ............ *A63F 13/56* (2014.09); *A63F 13/533* (2014.09)

(58) Field of Classification Search
CPC .... A63F 13/56; A63F 13/533; A63F 13/2145; A63F 13/577; A63F 13/837; A63F 2300/308

(Continued)

(56) References Cited

U.S. PATENT DOCUMENTS

2007/0268295 A1 11/2007 Okada
2008/0096654 A1* 4/2008 Mondesir .............. A63F 13/213 463/31

(Continued)

FOREIGN PATENT DOCUMENTS

CN 107096230 A 8/2017
CN 110665219 A 1/2020

(Continued)

OTHER PUBLICATIONS

1st Office Action dated Feb. 14, 2025 of Chinese Application No. 202111546390.9.

(Continued)

*Primary Examiner* — Michael A Cuff
(74) *Attorney, Agent, or Firm* — Qinghong Xu

(57) ABSTRACT

A game control method is provided. The method comprises: acquiring the distance between a game character and a shielding face, and an included angle between the orientation of the game character and a vertical line of the shielding face; displaying a bunker-entering control on a graphical user interface when the distance is smaller than or equal to a first preset distance and the included angle is smaller than or equal to a preset included angle; and in response to a selection operation for the bunker-entering control, controlling the game character to move to a shielding area corresponding to the shielding face, such that a bunker shields the game character.

20 Claims, 10 Drawing Sheets

(58) Field of Classification Search
USPC ........................................................... 463/31
See application file for complete search history.

(56) References Cited

U.S. PATENT DOCUMENTS

| | | | | |
|---|---|---|---|---|
| 2009/0311652 | A1 | 12/2009 | Langridge | |
| 2015/0031421 | A1* | 1/2015 | Jo | A63F 13/30 463/2 |
| 2019/0259200 | A1 | 8/2019 | Hoof | |
| 2020/0206638 | A1* | 7/2020 | Nakano | A63F 13/795 |

FOREIGN PATENT DOCUMENTS

| | | | | | |
|---|---|---|---|---|---|
| CN | 111079223 | A | | 4/2020 | |
| CN | 111957040 | A | | 11/2020 | |
| CN | 112774201 | A | | 5/2021 | |
| CN | 113426124 | A | | 9/2021 | |
| CN | 113559516 | A | | 10/2021 | |
| CN | 114225416 | A | | 3/2022 | |
| JP | 2002360920 | A | | 12/2002 | |
| JP | 2013255617 | A | | 12/2013 | |
| JP | 2018110659 | A | * | 7/2018 | A63F 13/5378 |
| KR | 20210050420 | A | | 5/2021 | |
| WO | WO-2016176185 | A1 | * | 11/2016 | A61B 5/162 |
| WO | WO-2020151594 | A1 | * | 7/2020 | A63F 13/5255 |

OTHER PUBLICATIONS

Video-Frontline Commando 2021, I won't be updating the final parts, https://www.bilibili.com/video/BV1aX4y1P7VZ/?share_source=copy_web&vd_source=a3ba6b896b16650e2baecf7b0844e00e.

Video-Gears 5 Campaign Cleared: Newbie Boot Camp?! (Dragon Brother is Here), https://www.bilibili.com/video/BV1gJ411M7io/?share_source=copy_web&vd_source=a3ba6b896b16650e2baecf7b0844e00e.

Video-[Popular Mobile Game Recommendation] "Citywide Gunfight" features a unique TPS cover-based shooting combat system and a massive arsenal of weapons and equipment., https://www.bilibili.com/video/BV1KE411a7A4/?share_source=copy_web&vd_source=a3ba6b896b16650e2baecf7b0844e00e.

International Search Report dated Jan. 11, 2023 of International Application No. PCT/CN2022/127890.

* cited by examiner

Figure 8:
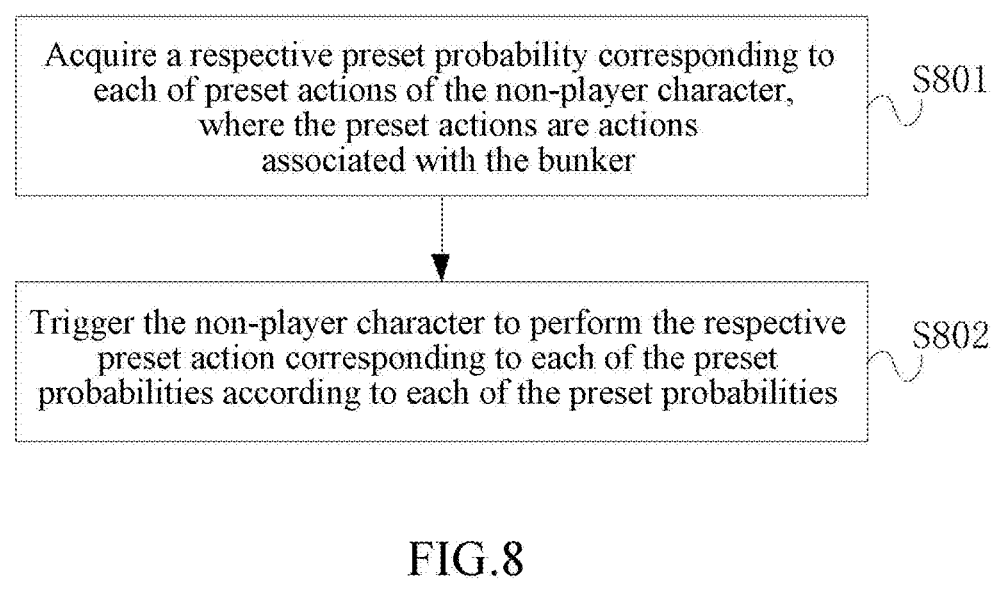

Acquire a respective preset probability corresponding to each of preset actions of the non-player character, where the preset actions are actions associated with the bunker

S801

Trigger the non-player character to perform the respective preset action corresponding to each of the preset probabilities according to each of the preset probabilities

GAME CONTROL METHOD AND APPARATUS

CROSS REFERENCE TO RELATED APPLICATION(S)

The present disclosure is the US National Phase Application of PCT Application No. PCT/CN2022/127890, filed on Oct. 27, 2022, which is based upon and claims the priority of the Chinese patent application with an application number of 202111546390.9, filed on Dec. 16, 2021, and titled by "Game Control Method and Apparatus", the entire content of both of which is incorporated herein by reference for all purposes.

TECHNICAL FIELD

The embodiments of the present disclosure relate to computer technology, and in particular, to a game control method and apparatus.

BACKGROUND

With the continuous development of Internet technology, games are playing an increasingly important role in people's daily life.

Among these games, there is a third-person game. In the third-person game, the game character operated by the player is visible on the screen. Current third-person games usually support a series of actions such as movement, crouching, jumping, and so on, of the game character, so as to enhance the richness of the game behavior of the game character.

However, the designs of the game behavior in the related art are usually for the game character itself, which may lead to a relatively simple behavior of the game character.

It should be noted that the information disclosed in the above background section is only used for enhancing the understanding of the background of the present disclosure, and therefore may include information that does not constitute related art known to those of ordinary skill in the art.

SUMMARY

The embodiments of the present disclosure provide a game control method and apparatus to overcome the problem that the behavior of the game character is relatively simple.

In a first aspect, the present disclosure provides a game control method, and the method includes:

- acquiring a distance between a game character and an occlusion surface of a bunker, and an included angle between an orientation of the game character and a vertical line of the occlusion surface;
- in response to determining the distance is less than or equal to a first preset distance and the included angle is less than or equal to a preset included angle, displaying an entering bunker control corresponding to the occlusion surface on a graphical user interface; and
- in response to detecting a selection operation on the entering bunker control, controlling the game character to move to an occlusion area corresponding to the occlusion surface, where the bunker covers the game character.

In a second aspect, the present disclosure provides a game control apparatus and the apparatus comprises:

- an acquiring module, configured to perform acquiring a distance between a game character and an occlusion surface of a bunker, and an included angle between an orientation of the game character and a vertical line of the occlusion surface;
- a display module, configured to perform, in response to determining the distance is less than or equal to a first preset distance and the included angle is less than or equal to a preset included angle, displaying an entering bunker control corresponding to the occlusion surface on a graphical user interface; and
- a controlling module, configured to perform, in response to detecting a selection operation on the entering bunker control, controlling the game character to move to an occlusion area corresponding to the occlusion surface, where the bunker covers the game character.

In a third aspect, the present disclosure provides a game control device, including:

- a memory, configured to store a program; and
- a processor, configured to execute the program stored in the memory, where the processor is configured to perform the method mentioned in any one of the above first aspect and various possible designs of the first aspect when the program is executed.

In a fourth aspect, the present disclosure provides a computer-readable storage medium, including instructions, where the instructions cause a computer to perform the method mentioned in any one of the above first aspect and various possible designs of the first aspect when being run on the computer.

In a fifth aspect, the present disclosure provides a computer program product, including a computer program, where the computer program implements the method mentioned in any one of the above first aspect and various possible designs of the first aspect when being executed by a processor.

The embodiments of the present disclosure provide a game control method and apparatus. The method includes: acquiring a distance between a game character and an occlusion surface, and an included angle between an orientation of the game character and a vertical line of the occlusion surface. When the distance is less than or equal to a first preset distance, and the included angle is less than or equal to a preset included angle, an entering bunker control is displayed on the graphical user interface. In response to the selection operation on the entering bunker control, the game character is controlled to move to the occlusion area corresponding to the occlusion surface, so that the bunker covers the game character. By acquiring the distance and included angle between the game character and the occlusion surface, when both the distance and included angle meet the conditions, an entering display control corresponding to the current occlusion surface is displayed in the graphical user interface. The game character is then controlled to move to the occlusion area according to a selection operation on the entering bunker control to realize occlusion of the game character by the bunker, so that the interaction between the game character and the bunker in the game scene can be effectively realized, thereby avoiding the problem that the game character's behavior is relatively simple.

It should be understood that the forgoing general description and the following detailed description are exemplary and explanatory only and do not limit the present disclosure.

BRIEF DESCRIPTION OF THE DRAWINGS

In order to illustrate the technical solutions of the embodiments of the present disclosure or the related art more clearly, the accompanying drawings, which are to be used in the description of the embodiments or the related art, will be briefly introduced below. Apparently, the drawings in the following description are only some embodiments of the present disclosure, and for those skilled in the art, other drawings may be obtained according to these drawings without paying creative efforts.

FIG. 8 is a third flowchart of the game control method provided by an embodiment of the present disclosure;

DETAILED DESCRIPTION

In order to make the objects, technical solutions and advantages of the embodiments of the present disclosure clearer, the technical solutions in the embodiments of the present disclosure will be clearly and completely described in the following in conjunction with the accompanying drawings in the embodiments of the present disclosure. Obviously, the described embodiments are a part of the embodiments of the present disclosure, and not all of the embodiments. Based on the embodiments in the present disclosure, all other embodiments obtained by a person of ordinary skill in the art without creative efforts fall within the scope of protection of the present disclosure.

In order to better understand the technical solutions of the present disclosure, the related art involved in the present disclosure is further introduced in detail below.

With the continuous development of Internet technology, the development of the game industry has also made great progress, and the current games play an increasingly important role in people's daily life.

Among various games, there is a third-person game in which a game character operated by a player is visible on the screen, for example, a third-person shooter game. The third-person shooter game is a type of 3D shooting game, and the combat manner of this type of game focuses on shooting.

Unlike the first-person shooter game, in which the player usually may only see the weapon held by the operated game character in the game interface, which gives the player a sense of sight of substituting the game operation from a first-person, in the third-person shooter game, however, the player may usually see part or all of the screen of the operated game character in the game interface. For example, it may be understood with reference to FIG. 1, which is a schematic diagram of an implementation of a third-person game provided by an embodiment of the present disclosure.

Figure 1:
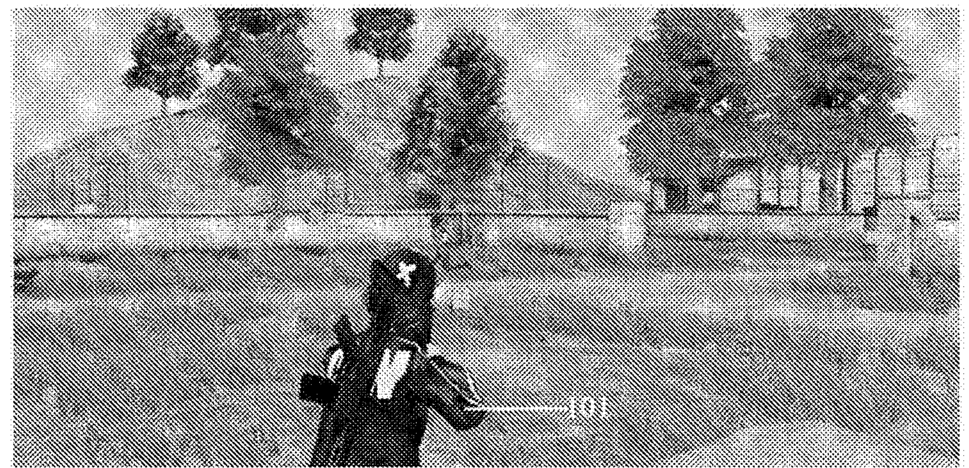
FIG. 1 is a schematic diagram of an implementation of a third-person game provided by an embodiment of the present disclosure.

As shown in FIG. 1, for a third-person game, the game character 101 operated by the player may be seen on the graphical user interface. In the case of a first-person game, usually only the weapon held by the operated game character is visible on the graphical user interface.

Therefore, for the games with a third-person, the game characters in the game may generate intuitive feedback on player operations through action behaviors. In addition, as more and more third-person shooter games appear on the mobile terminals, the design and improvement of combat gameplay also become more and more important.

At present, the main combat gameplay of common third-person shooter games is: to be able to hit and destroy the enemy target while reducing or avoiding being hit by the enemy. On this basis, the direction for improving the combat experience of the existing third-person shooter games includes: in addition to the movement, aiming, and shooting operations of the game character, adding behaviors of the game character such as crouching, getting down, jumping and rolling, as well as adding carriers such as vehicles and ships that change the way of movement and attack, etc.

The above behaviors can increase the freedom of the behavior of the player in operating the game character and the variety of the combat strategy, but the current improvements of the combat gameplay are all aimed at enhancing the richness of the own behavior of the game character operated by the player. It may be understood that a third-person game can effectively improve the user's gaming experience if it is able to restore the logic of the actual scene as much as possible. Therefore, in the current implementation, only the behavior of the game character itself is designed without considering the connection with the objects in the environment, which will lead to a relatively simple behavior of the game character.

With regard to the problems in the related art, the present disclosure proposes the following technical concept: by designing the connection and interaction between the game character and the object within the environment, such as designing a bunker that may cover the game character in the game, during the procedure of the shooting game, the game character may look for a suitable bunker and establish a connection with the bunker in order to realize the occlusion of itself and reduce the exposed surface, so that the real tactical shooting experience can be effectively restored, and the problem that the game character's behavior is relatively simple can thus be avoided.

On the basis of the above contents of introduction, the game control method in the game provided by the present disclosure is introduced below, and the application scenario of the game control method in the game of the present disclosure is first described.

The game control method in the game in the embodiments of the present disclosure may run on a local terminal device or a cloud interactive system.

The cloud interaction system includes a cloud server and a user device for running a cloud application. The cloud applications run separately.

In an optional implementation manner, the cloud gaming refers to a gaming manner based on cloud computing. In an operation mode of cloud gaming, the main body for running the game program and the main body for presenting the game screen are separated, the storage and running of the object control method are completed on the cloud game server, and the cloud game client is used for receiving and sending data as well as presenting the game screen. For example, the cloud game client may be a display device with data transmission function close to the user side, such as a mobile terminal, a TV, a computer, a palmtop computer, etc., and the game data is processed by the cloud game server in the cloud. When playing a game, the player operates the cloud game client to send an operation instruction to the cloud game server. The cloud game server runs the game according to the operation instruction, encodes and compresses data such as the game screen, and returns the data to the cloud game client through the network. Finally, the game screen is decoded and output by the cloud game client.

In an optional implementation manner, the local terminal device stores the game program and is used for presenting the game screen. The local terminal device is used for interacting with the player through the graphical user interface, that is, conventionally, the electronic device downloads, installs and runs the game program. The local terminal device may provide the graphical user interface to the player in various manners, for example, it may be rendered and displayed on the display of the terminal, or provided to the player through holographic projection. By way of example, the local terminal device may include a display and a processor, the display is used for presenting a graphical user interface, and the graphical user interface includes a game screen. And the processor is configured to run the game, generate a graphical user interface, and control the display of the graphical user interface on the display.

The game control method in the game provided by the present disclosure is introduced below with reference to specific embodiments. In each embodiment of the present disclosure, a graphical user interface may be obtained by executing a game application and rendering on a display of a terminal device. The game application may run on the terminal device, and the graphical user interface obtained through the above rendering is an interface in the game application.

The graphical user interface is briefly described herein, where the graphical user interface refers to a computer operation user interface displayed in a graphical manner, which allows the user to manipulate icons or menu controls on the screen using an input device. The input device may be, for example, a mouse or a touch screen, which is not limited in this embodiment. The user interacts with the client or the server by operating through the graphical user interface during the game.

Figure 2:
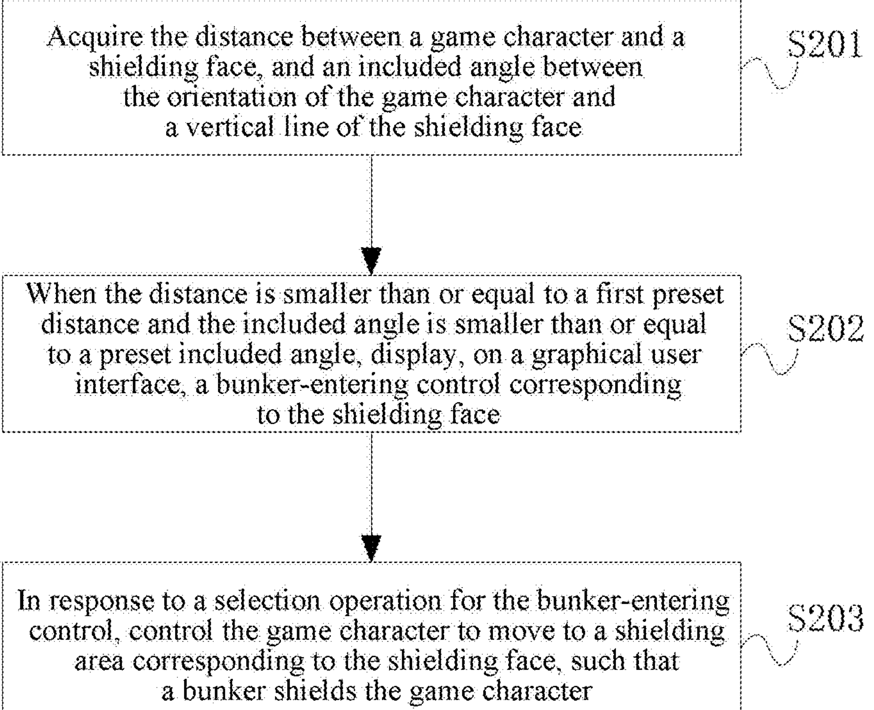
FIG. 2 is a flowchart of a game control method provided by an embodiment of the present disclosure.

On the basis of the above introduction, firstly, the game control method provided by an embodiment of the present disclosure is introduced with reference to FIG. 2, and FIG. 2 is a flowchart of the game control method provided by the embodiment of the present disclosure.

As shown by FIG. 2, the method includes the following steps.

In step S201, a distance between a game character and an occlusion surface, and an included angle between an orientation of the game character and a vertical line of the occlusion surface of the bunker are acquired.

In this embodiment, there is a bunker in the graphical user interface, where the bunker may be understood as a preset object in the game, and the bunker is used for occluding the game character to reduce the exposed surface of the game character. In a possible implementation manner, there may be many objects in the graphical user interface, and for example, which specific object may be used as the bunker may be pre-configured. For example, the bunker may be a wall, a trash can, a stone pile, a sandbag, and so on in the game, and the present embodiment does not limit the specific implementation of the bunker. Any game object that may be used for occluding the game object is able to be used as the bunker in the present embodiment. Therefore, the specific implementation of the bunker may be selected according to actual requirements of the game design.

In addition, it should be noted that not any object in the game may be used as the bunker in the present embodiment, because the bunker in this embodiment is preset. For example, it is preset that a trash can A in the game scene may be used as a bunker, the trash can A then has the relevant attribute of the bunker. For another example, there is a wall B in the game scene, assuming that the wall B is not currently set as a bunker, then the wall B does not have the attribute of the bunker. In this embodiment, only when an object has the function of a bunker, the game character may interact with the object acting as a bunker accordingly.

In addition, in this embodiment, the bunker may include at least one occlusion surface. In a possible implementation manner, any bunker may include a plurality of surfaces. As to which of these surfaces may be used as the occlusion surface, it may, for example, be preset, which is not limited by this embodiment.

The following takes any bunker in the graphic user interface and any occlusion surface of the current bunker as an example for illustration. It may be understood that if the game character intends to interact with the corresponding bunker, it is required that the game character is at least located near the bunker. And during the actual procedure of the game, the game character may move in the graphical user interface in response to the user's operation.

Therefore, the distance between the game character and the bunker surface may, for example, be acquired. In a possible implementation manner, for example, the distance between the game character and the bunker may be acquired in real time, or the distance between the game character and the bunker may be acquired periodically with a preset duration as a cycle, or the distance between the game character and the bunker may also be acquired each time a movement of the game character is detected, which is not limited by this embodiment. The currently acquired distance may be, for example, a straight-line distance between the game character and the bunker surface.

In addition, the bunker in this embodiment may, for example, include at least one occlusion surface, and when realizing occlusion of the game character through the bunker, it is specifically the occlusion surface that realizes occlusion of the game character, and thus the included angle between the orientation of the game character and a vertical line of the occlusion surface of the bunker may also be acquired in this embodiment. By acquiring the included angle, the intention of the current operation of the user may be determined, that is, it may be determined whether the user needs to operate the bunker to cover the game character, and it may also be determined whether the current occlusion surface may realize occlusion of the game character.

And in a possible implementation manner, in this embodiment, it may also be determined whether the game character is located at the side of the occlusion surface.

It should be noted herein that the present embodiment is illustrated by taking any bunker and any occlusion surface of this bunker as an example. In the actual implementation procedure, the implementation manners are similar for different bunkers and different occlusion surfaces. As for the distance and included angle corresponding to which specific bunker surface to be acquired, it mainly depends on the position of the game character. For example, the above-mentioned acquisition operation of distance and included angle may be performed when the game character approaches a certain bunker surface.

In step S202, when the distance is less than or equal to a first preset distance, and the included angle is less than or equal to a preset included angle, an entering bunker control corresponding to the occlusion surface is displayed on the graphic user interface.

The distance between the game character and the bunker surface is acquired above. In a possible implementation manner, for example, the distance may be compared with the first preset distance, and when it is determined that the distance is less than or equal to the first preset distance, it can be determined that the game character is located near the bunker, then the current distance between the game character and the bunker surface satisfies the condition for occlusion.

In addition, the included angle between the game character and the vertical line of the bunker surface is also acquired above. In a possible implementation manner, for example, the included angle may be compared with the preset included angle, and when it is determined that the included angle is less than or equal to the preset included angle, it can be determined that the current positional relationship between the game character and the bunker surface satisfies the condition for occlusion.

Therefore, when it is determined that the distance is less than or equal to the first preset distance, and the included angle is less than or equal to the preset included angle, and when the game character is at the side of the occlusion surface, it can be determined that the current game character meets the conditions for the current bunker to cover the current game character. Thus, the entering bunker control corresponding to the occlusion surface may be displayed in the graphical user interface, where the occlusion surface refers to the above occlusion surface for acquiring the distance and included angle. The entering bunker control, for example, may be displayed near the current bunker surface to be interacted with, or may also be displayed at a preset position. The display position and specific display manner of the entering bunker control are not limited by the present embodiment, and may be selected and set according to actual needs.

In step S203, in response to a selection operation on the entering bunker control, the game character is controlled to move to an occlusion area corresponding to the occlusion surface, so that the bunker covers the game character.

In this embodiment, the entering bunker control may be provided to the user for the user to trigger the game character to interact with the current bunker. Therefore, in this embodiment, for example, in response to the selection operation on the entering bunker control, the game character may be controlled to move to the occlusion area corresponding to the occlusion surface, so that the game character is covered by the bunker.

In a possible implementation manner, after detecting that the user triggers the entering bunker control, when the game character is controlled to move to the occlusion area corresponding to the occlusion surface, the game character may be directly controlled to be located in the occlusion area corresponding to the occlusion surface with a certain posture, so as to realize an effective simulation of using the bunker for occlusion in an actual scene.

In addition, it is worth stating that in this embodiment, when the selection operation on the entering bunker control is detected, the game character is directly controlled to move to the occlusion area corresponding to the occlusion surface, so as to realize the effect of occlusion. Therefore, when displaying the entering bunker control as described above, it can be displayed only when the game character and the occlusion surface meet a certain condition.

Otherwise, if the game character is not located near the occlusion surface or the positional relationship between the game character and the occlusion surface is not a relationship in which the character can be covered, and the entering bunker control is displayed at this time, even if the user clicks the entering bunker control, the corresponding bunker surface may not quickly realize occlusion of the game character effectively. If the game character is forcibly moved to the occlusion area of the occlusion surface, it may lead to a transient movement of the game character, which is not conducive to a good game experience and the simulation of the real scenes.

Therefore, in this embodiment, the entering bunker control is displayed only when the game character and the occlusion surface meet a certain condition, thereby effectively ensuring the effectiveness of the occlusion for the game character by the bunker.

In addition, it should be noted that in this embodiment, after the selection operation on the entering bunker control is detected and the game character is controlled to move to the occlusion area corresponding to the occlusion surface, the game character at this time is not simply located behind the bunker. The game character may also establish a corresponding connection with the current bunker, and the game character may perform a series of operations on the basis of the bunker. Therefore, in this embodiment, the game character is not simply moved, but the interaction between the game character and the bunker is realized so as to effectively enhance the interaction between the game character and the environment.

The game control method provided by the embodiments of the present disclosure includes: acquiring a distance between a game character and an occlusion surface, and an included angle between an orientation of the game character and a vertical line of the occlusion surface. When the distance is less than or equal to a first preset distance, and the included angle is less than or equal to a preset included angle, an entering bunker control is displayed on the graphical user interface. In response to the selection operation on the entering bunker control, the game character is controlled to move to the occlusion area corresponding to the occlusion surface, so that the bunker covers the game character. By acquiring the distance and included angle between the game character and the occlusion surface, when both the distance and angle meet the conditions, an entry display control corresponding to the current occlusion surface is displayed in the graphical user interface. The game character is then controlled to move to the occlusion area according to a selection operation on the entering bunker control to realize occlusion of the game character by the bunker, so that the interaction between the game character and the bunker in the game scene can be effectively realized, thereby avoiding the problem that the game character's behavior is relatively simple.

Figure 3:
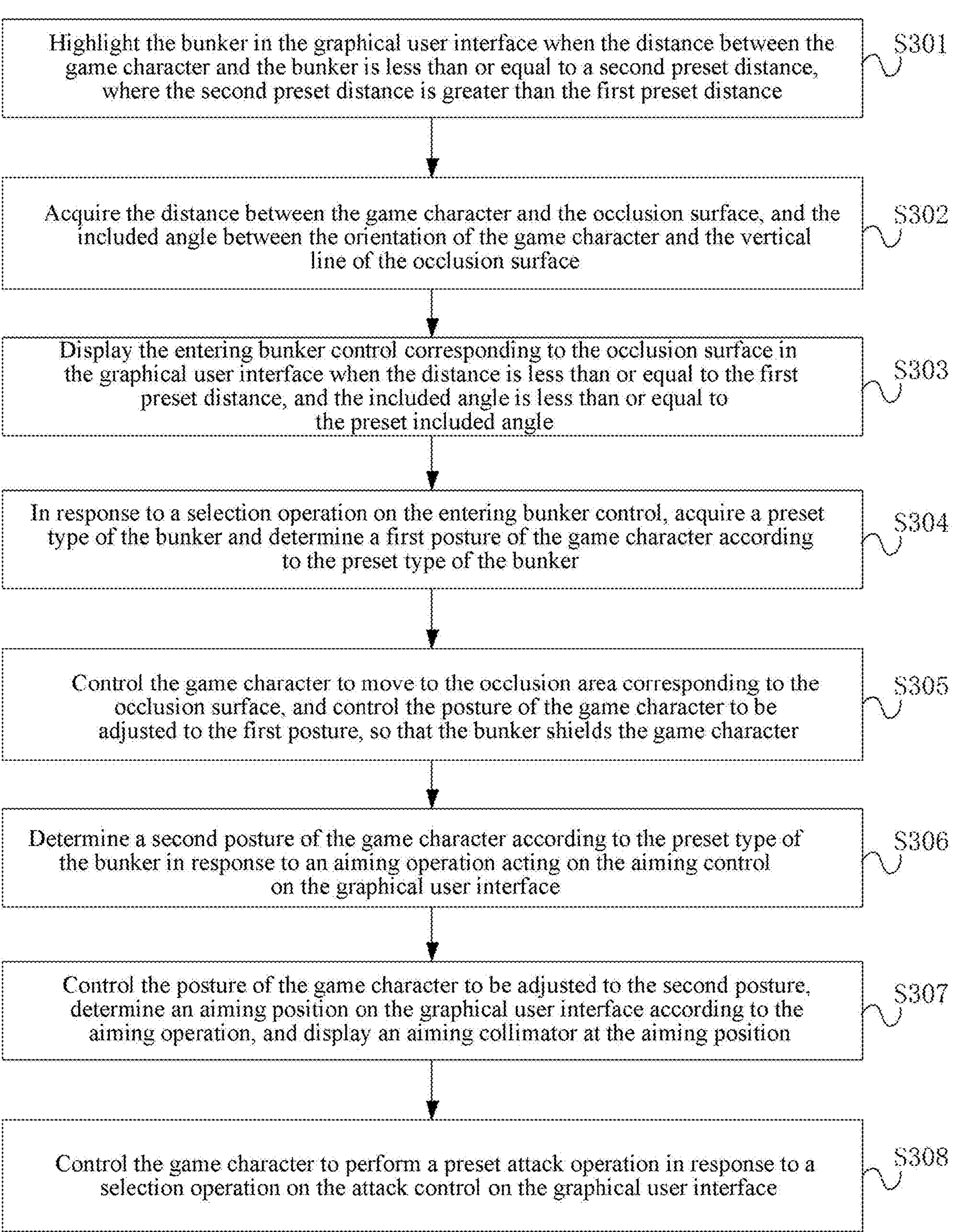
FIG. 3 is a second flowchart of the game control method provided by an embodiment of the present disclosure.
Figure 4:
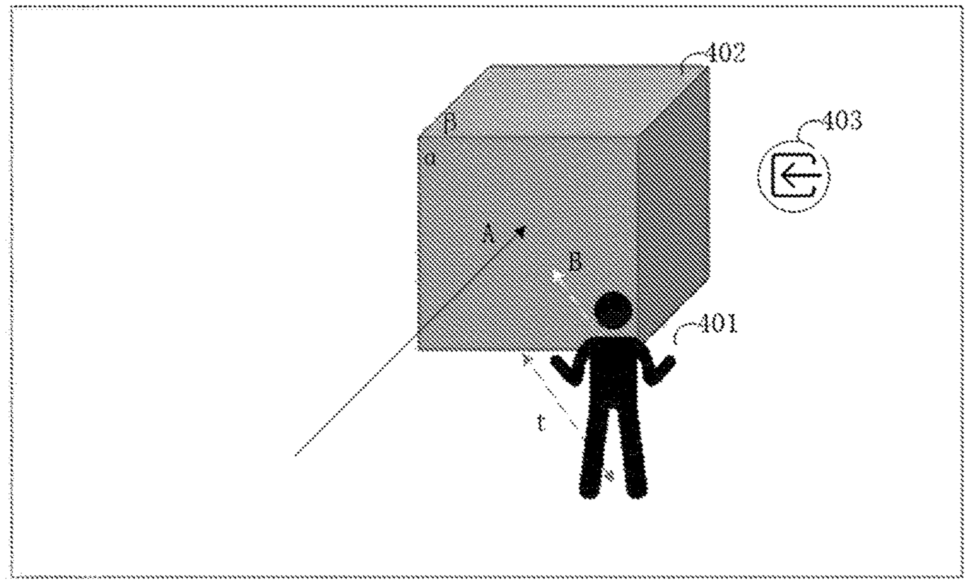
FIG. 4 is a schematic diagram of positions of a game character and a bunker provided by an embodiment of the present disclosure.

On the basis of the content introduced in the above embodiments, the game control method provided by the present disclosure will be further described in detail below in conjunction with FIG. 3 to FIG. 7. FIG. 3 is a second flowchart of the game control method provided by an embodiment of the present disclosure. FIG. 4 is a schematic diagram of positions of a game character and a bunker provided by an embodiment of the present disclosure. FIG.

Figure 6:
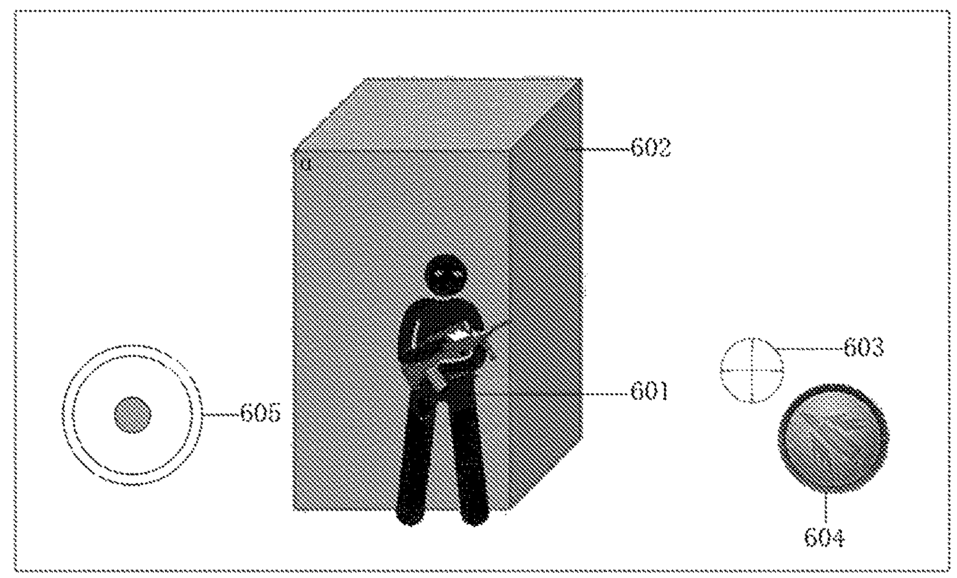
FIG. 6 is a first schematic diagram of an implementation of a game character located in a bunker area provided by an embodiment of the present disclosure.
Figure 7:
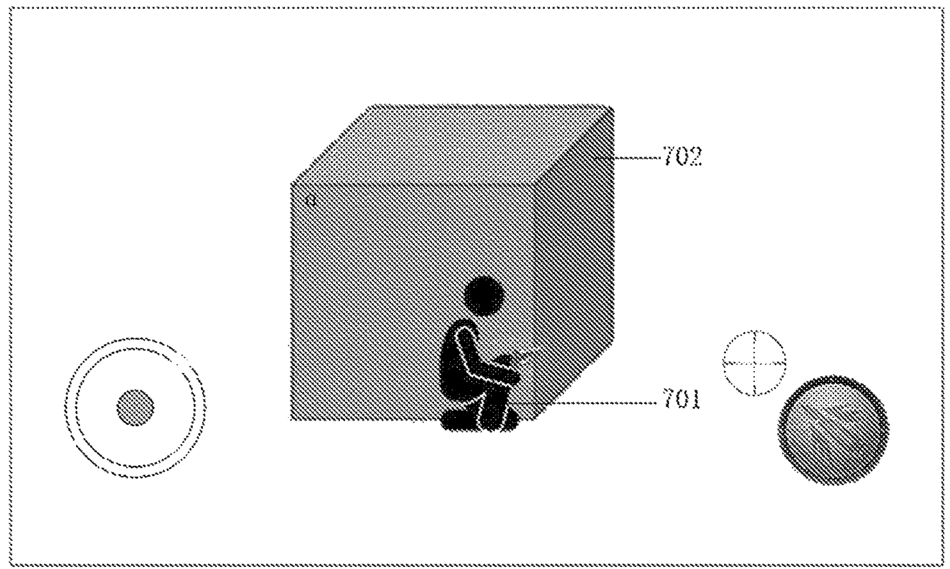
FIG. 7 is a second schematic diagram of an implementation of a game character located in a bunker area provided by an embodiment of the present disclosure.

5 is a schematic diagram of an allowable range of the orientation of the game character provided by an embodiment of the present disclosure. FIG. 6 is a first schematic diagram of an implementation of a game character located in a bunker area provided by an embodiment of the present disclosure. FIG. 7 is a second schematic diagram of an implementation of a game character located in a bunker area provided by an embodiment of the present disclosure.

As shown in FIG. 3, the method includes the following steps.

In step S301, when the distance between the game character and the bunker is less than or equal to a second preset distance, the bunker is highlighted in the graphical user interface, where the second preset distance is greater than the first preset distance.

In the present embodiment, it is also illustrated by taking any one of the occlusion surfaces of any one of the bunkers as an example. For example, a distance between the game character and the bunker is acquired before acquiring the distance and included angle between the game character and the occlusion surface, and then the distance between the game character and the bunker is compared with a second preset distance to determine whether the distance between the game character and the occlusion surface is less than or equal to the second preset distance.

When it is determined that the distance between the game character and the bunker is less than or equal to the second preset distance, the bunker may be highlighted in the graphical user interface. In a possible implementation manner, in this embodiment, the second preset distance is greater than the first preset distance, that is, the bunker may be highlighted when the game character is still a distance away from the bunker before reaching the vicinity of the bunker.

In a possible implementation manner, for example, the bunker may be displayed in a preset manner, so as to realize highlighting the bunker. The preset manner in this embodiment may include at least one of the following: displaying the bunker with a relatively high brightness in the graphical user interface; or displaying a frame line in the graphical user interface, where the bunker is located within the frame line; or displaying a bunker label on the bunker in the graphical user interface.

The purpose of displaying a bunker in a preset manner is to effectively prompt the user where the current bunker is located when the user is about to approach the bunker, thus enabling the user to quickly distinguish which current objects are bunkers and where the bunker is located, after which the user may operate the game character to approach the bunker.

In the actual implementation procedure, the specific implementation of the preset manner may be selected according to actual needs, which is not limited by this embodiment, as long as the preset manner is able to serve to prompt the user the location of the bunker.

In a possible implementation manner, when designing the bunker in a game, in order to enable the player to quickly distinguish between a bunker and a non-bunker, the representation of the bunker may, for example, be regulated in a certain way. In a possible implementation manner, for example, all the bunkers in the game may be set to be cubes. That is, cube objects may be selected as the bunkers when setting the bunkers. Alternatively, all the bunkers in the game may be set to be circular, or all the bunkers in the game may be set to present a same color.

That is, in this embodiment, the representation of the bunker may be set to a preset display state, where the preset display state may include a preset shape, a preset color, etc. The present embodiment does not limit the specific implementation of the preset display state for regulating the representation of the bunker, as long as it may enable the player to quickly distinguish whether the object in the game is a bunker or a non-bunker to a certain extent.

In step S302, the distance between the game character and the occlusion surface, and the included angle between the orientation of the game character and the vertical line of the occlusion surface are acquired.

The implementation manner of S302 is similar to the implementation manner of S201, and will not be repeated herein.

In step S303, when the distance is less than or equal to the first preset distance, and the included angle is less than or equal to the preset included angle, the entering bunker control corresponding to the occlusion surface is displayed in the graphical user interface.

The implementation manner of S303 is similar to the implementation manner of S202, and the specific implementation manner will not be repeated herein.

In this embodiment, the implementation manner of the distance and the included angle may be further introduced in conjunction with FIG. 4. As shown in FIG. 4, it is assumed that a game character 401 and a bunker 402 exist currently in the graphical user interface. Taking the occlusion surface $\alpha$ of the bunker 402 as an example, for example, the acquired distance between the game character 401 and the bunker surface $\alpha$ is the distance indicated by t in FIG. 4.

In addition, the orientation of the game character 401 may be, for example, the orientation indicated by the arrow B in FIG. 4, that is, diagonally facing the occlusion surface $\alpha$, and the vertical line of the occlusion surface may be, for example, indicated by arrow A in FIG. 4. The vertical line of the occlusion surface in this embodiment may be a vertical line oriented toward the occlusion surface, and the included angle between arrow A and arrow B is then the included angle between the orientation of the game character and the vertical line of the occlusion surface.

The distance then may be compared with the first preset distance, and the included angle may be compared with the preset included angle. When it is determined that both the distance and the included angle meet the conditions, then referring to FIG. 4, an entering bunker control 403 corresponding to the occlusion surface $\alpha$ may be displayed in the graphical user interface.

In the actual implementation procedure, the specific design, the specific setting position and the like of the bunker control may be selected according to actual requirements, which is not limited in this embodiment.

Figure 5:
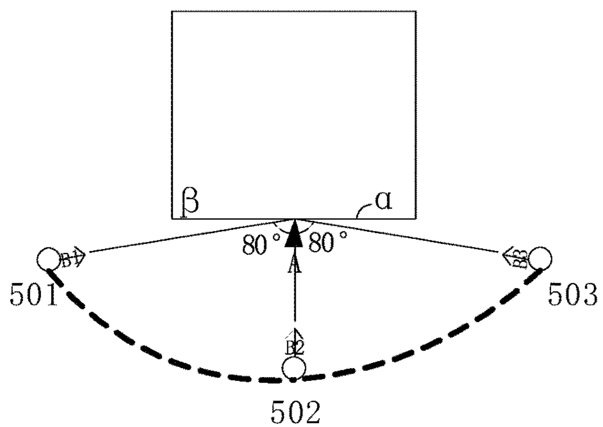
FIG. 5 is a schematic diagram of an allowable range of the orientation of the game character provided by an embodiment of the present disclosure.

The preset included angle in this embodiment may be, for example, 80°. The limitation of the preset included angle may, for example, be further understood in conjunction with FIG. 5. As shown in FIG. 5, the rectangle shown in FIG. 5 is, for example, a top view of the bunker introduced above, such as a $\beta$ surface of the bunker in above FIG. 4, the bottom line of the rectangle shown in FIG. 5 corresponds to the effect of top view of the a surface, and the line of arrow A shown in FIG. 5 corresponds to the vertical line of the a surface.

Taking the preset included angle of 80° as an example, when the game character is at the position indicated by 501 in FIG. 5, the included angle between the orientation B1 of the game character and the vertical line A of the occlusion surface $\alpha$ is 80°; when the game character is at the position indicated by 502 in FIG. 5, the included angle between the orientation B2 of the game character and the vertical line A of the occlusion surface $\alpha$ is 0°; and when the game character is at the position indicated by 503 in FIG. 5, the included angle between the orientation B3 of the game character and the vertical line A of the occlusion surface α is 80°. For the orientation of the game character, as long as the orientation of the game character falls within the range of orientation shown by the dotted line in FIG. 5, it is satisfied that the included angle is less than or equal to the preset included angle as introduced above.

In the actual implementation procedure, the specific implementation manner of the preset included angle may also be selected and set according to actual requirements, which is not limited in this embodiment, as long as the preset included angle is set to limit that the bunker control is displayed when the game character faces the occlusion surface to a certain extent.

In step S304, in response to a selection operation on the entering bunker control, a preset type of the bunker is acquired, and a first posture of the game character is determined according to the preset type of the bunker.

In the graphical user interface in this embodiment, the corresponding operation on the bunker control may be detected. In a possible implementation manner, for example, when a selection operation on the bunker control is detected, it may be determined that the bunker surface corresponding to the current bunker control is required to cover the game character.

It may be understood that the bunker set in the game is usually immovable. Therefore, in this embodiment, the game character may be controlled to move to the occlusion area corresponding to the occlusion surface, so as to realize occlusion of the game character through the bunker.

In a possible implementation manner, in this embodiment, a preset type is set for each bunker, where the preset type may be regarded as a configuration attribute of the bunker and the preset type may be any one of the following: a high bunker, and a low bunker, where the high bunker refers to a bunker with a relatively high height, and the low bunker refers to a bunker with a relatively low height.

In this embodiment, for the high bunker and low bunker, the postures presented by the game character when moving to the occlusion area are different. Therefore, for example, the preset type of the bunker may be acquired, and the first posture of the game character may be determined according to the preset type of the bunker.

For example, if the preset type of the bunker is a high bunker, it may be determined that the current bunker is relatively high, so for example, it may be determined that the first posture is a standing posture. And, if the preset type of the bunker is a low bunker, it may be determined that the current bunker is relatively low, so for example, it may be determined that the first posture is a non-standing posture, where the non-standing posture includes a crouching posture and a prone posture.

In a possible implementation manner, when the preset type of the bunker is a low bunker, it may, for example, be preset whether the specific behavior is a crouching posture or a prone posture, or be adaptively determined according to the length and width of the current bunker, which is not limited in this embodiment, as long as it may be ensured that the bunker covers the game character as much as possible.

It is worth noting that the purpose for setting different postures for the high bunker and the low bunker herein is to ensure that occluding the game character may be achieved in either the case of high bunker or low bunker. For example, for the low bunker, if the crouching posture or prone posture is not set, then if the game character moves directly to stand in the occlusion area of the low bunker, the bunker may not be able to effectively cover the game character. Meanwhile, if the game character moves directly to stand in the occlusion area of the low bunker and the posture of the game character is then adjusted by the user, it will undoubtedly increase the user's operation cost and operation time and fail to efficiently realize occluding the game character through the bunker.

Therefore, in this embodiment, by setting the corresponding postures of the game character for different preset types of bunkers, the occlusion for the game character through the bunker can be effectively and quickly achieved.

In a possible implementation manner, at least the parameters shown in Table 1 below may be set for any bunker, for example.

TABLE 1

| Parameters | Parameter description |
|---|---|
| Size, relative position, and angle parameter of the bunker surface | Determining logically the size and relative position of the bunker surface |
| Durability | Determining how many shots destroy the bunker and make it lose the bunker function |
| Bunker surfaces that can be leaned on | Determining which of the four vertical faces of the bunker are the bunker surfaces |
| Whether to be rolled over | Determining whether or not the game character may roll over the bunker after leaning on the bunker surface |
| Whether can block the explosion | Determining whether or not the rear of the bunker is affected by an explosion when the explosion occurs |
| The orientation of the character entering the bunker | Determining the orientation (facing left or right) of the game character in the bunker when entering the bunker |

Based on the introduction in above Table 1, it can be determined that the parameters described above may be set for any bunker in this embodiment, and specific description of each parameter is also introduced in the above Table 1. The specific behavior of the game character when it is located in the occlusion area of the bunker may be determined through setting the corresponding parameters. In the actual implementation procedure, in addition to the content introduced in Table 1 above, more implementation manners may be selected and set according to actual requirements for specific parameter settings.

The parameter setting of the above-mentioned bunker may be done, for example, after completing the creation of the appearance of the bunker model for a single bunker, through a manner of adding a bunker script to the model, so that the relevant attributes and functions described above are given to the current bunker.

In step S305, the game character is controlled to move to the occlusion area corresponding to the occlusion surface, and the posture of the game character is controlled to be adjusted to the first posture, so that the bunker covers the game character.

After the first posture is determined, the game character may be controlled to move to the occlusion area corresponding to the occlusion surface, and the posture of the game character is controlled to be adjusted to the first posture, so that the bunker covers the game character.

For example, the standing posture may be understood in conjunction with FIG. 6. As shown in FIG. 6, if a selection operation on the bunker control is detected currently, and the preset type of the bunker is currently determined to be a high bunker, then it can be determined that the first posture is the standing posture. Referring to FIG. 6, the game character 601 may be controlled to move to the occlusion area corresponding to the occlusion surface α of the bunker 602, where the posture of the game character 601 may be directly adjusted to the standing posture as shown in FIG. 6.

In addition, the crouching posture may be understood in conjunction with FIG. 7. As shown in FIG. 7, if a selection operation on the bunker control is detected currently, and the preset type of the bunker is currently determined to be a low bunker, then, for example, it can be determined that the first posture is the crouching posture. Referring to FIG. 7, the game character 701 may be controlled to move to the occlusion area corresponding to the occlusion surface α of the bunker 702, where the posture of the game character 701 may be directly adjusted to the crouching posture as shown in FIG. 7. The implementation manner of the prone posture is similar, which will not be repeated herein.

And it may be understood that, the above-mentioned standing posture and crouching posture shown in FIG. 6 and FIG. 7 are only possible implementation manners. In the actual implementation process, the initial standing position of the standing posture, the initial orientation of the game character in the standing posture, the hand movement of the standing posture, whether the hand holds a weapon, etc., all may be selected according to actual requirements. The same is also true for the crouching posture, and a more specific implementation manner in the crouching posture may also be selected according to actual requirements, which is not particularly limited in this embodiment.

In step S306, in response to an aiming operation acting on the aiming control on the graphical user interface, a second posture of the game character is determined according to the preset type of the bunker.

The game character in this embodiment may also perform a series of operations when located in the occlusion area. In a possible implementation manner, for example, an aiming control may be set in the graphical user interface, and the aiming control may be shown as 603 in FIG. 6, for example. Specifically, the aiming control is used to trigger the game character to enter a posture of holding a gun for aiming, and display the aiming collimator for aiming on the graphical user interface. Then, for example, the aiming operation on the aiming control may be detected, so as to determine the second posture of the game character according to the preset type of the bunker. The second posture in this embodiment refers to the posture of the game character holding a gun and aiming.

In a possible implementation manner, if the preset type of the bunker is the high bunker, the second posture in this embodiment may be, for example, the posture of sticking a head out from the side of the bunker; and if the preset type of the bunker is a low bunker, the second posture in this embodiment is the posture of sticking a head out from the top of the bunker.

For different preset types of bunkers, the directions in which the character sticks a head out when aiming with the gun are set to be different herein. Therefore, the rationality of the behavior of the game character can be effectively improved, and the occlusion for the game character can be achieved to the greatest extent.

In the actual implementation procedure, the specific position for sticking a head out (for example, sticking a head out from the left or from the right, sticking a head out from which position on the top), and more detailed posture for sticking a head out may be selected and set according to actual requirements, which is not limited by this embodiment.

In step S307, the posture of the game character is controlled to be adjusted to the second posture, and according to the aiming operation, an aiming position is determined on the graphical user interface, and an aiming collimator is displayed at the aiming position.

After the second posture is determined, the posture of the game character may be controlled to be adjusted to the second posture. The game character at this time is in the state of aiming, and the aiming operation in this embodiment is for the game character to hold the gun to aim. Then, for example, the aiming collimator may also be displayed at the preset position of the graphical user interface, and the aiming collimator therein may also be adjusted according to the movement operation of the user.

In step S308, in response to a selection operation on an attack control on the graphical user interface, the game character is controlled to perform a preset attack operation.

After adjusting the aiming collimator to the desired position, for example, the user may also control the game character to perform the corresponding attack operation. In a possible implementation manner, an attack control is set on the graphical user interface, where the attack control may be shown as 604 in FIG. 6, for example. Specifically, when a selection operation on the attack control is detected, the game character may be controlled to perform a preset attack operation. The preset attack operation herein may be, for example, a shooting operation, and the specific implementation manner thereof may be selected according to actual requirements, which is not limited by this embodiment.

It can be understood that the aiming control and the attack control shown in FIG. 6 are only a possible implementation manner. In the actual implementation procedure, the specific implementation of the aiming control and the attack control may be selected and set according to actual requirements, as long as they are able to realize the corresponding function.

In addition, when it is desired to control the game character to stop the posture of sticking a head out and return to the occlusion area, for example, the game character may be controlled to return to the occlusion area when a select operation on the aiming control is detected again. When the game character returns to the occlusion area, it may, for example, behave as the first posture described above according to the implementation manners described above.

And in other possible implementation manners, when the game character is in the occlusion area of the bunker surface, for example, the movement operation acting on the movement control may also be detected, so as to control the movement of the game character in the occlusion area of the bunker surface. The movement control herein may, for example, be shown as 605 in FIG. 6, and may receive the operation direction input by the user, so as to control the game character to move towards the corresponding operation direction in the occlusion area.

In a possible implementation manner, when the game character is located in the occlusion area, in order to avoid the game character being unable to realize effective observation of the surrounding environment due to approaching the occlusion object and a large portion of the game field of view being covered, in this embodiment, the range of the game field of view displayed in the graphical user interface may be enlarged, for example, after controlling the game character to move to the occlusion area corresponding to the occlusion surface.

For example, when the game character is controlled to move to the occlusion area corresponding to the occlusion surface, a first game perspective corresponding to the current graphical user interface may be adjusted to a second game perspective. In this embodiment, the field of view corresponding to the second game perspective is larger than the field of view corresponding to the first game perspective, so that the player can realize effective environment observation even when the game character is close to the occlusion object.

In addition, after the game character enters the occlusion area, when the bunker is no longer needed for occlusion, for example, the game character may also be controlled to leave the occlusion area. In a possible implementation manner, after controlling the game character to enter the occlusion area, for example, a leaving bunker control may be displayed in the graphical user interface, where the leaving bunker control may be the reuse of the entering bunker control introduced above. That is, after the game character enters the occlusion area, the function of the entering bunker control is switched to the function of the leaving bunker control. Alternatively, the leaving bunker control may also be a separate control configured, which is not limited in this embodiment.

For example, the game character may be controlled to leave the bunker in response to the selection operation on the leaving bunker control on the graphical user interface, so as to cancel the bunker from occluding the game character. When the game character leaves the bunker, the presented posture of the game character, the specific position of the game character and the like may be selected and set according to actual requirements, which is not limited in this embodiment.

Alternatively, in another possible implementation manner, the game character may be controlled to leave the bunker when determining that the game character is located on the side edge or upper edge of the bunker surface and the included angle is greater than the preset included angle, and detecting a movement operation of the game character towards the same direction as the above-mentioned side edge or upper edge.

For example, on the condition that the included angle is greater than the preset included angle, the game character is located at the left edge of the bunker, and when a movement operation to the left is detected, it may be determined that the current player wants to control the game character to leave the bunker, and therefore the game character may be controlled to leave the bunker. Similarly, the game character may also be controlled to leave the bunker when the game character is located at a right edge of the bunker and a movement operation to the right is detected, and when the game character is located at an upper edge of the bunker and a movement operation to the upper side is detected. In these cases, it may be determined that the player's operation intention is to control the game character to leave the bunker, therefore the game character may be controlled to leave the bunker.

In the game control method provided by the embodiments of the present disclosure, when the distance between the game character and the bunker is less than or equal to the second preset distance, the bunker is highlighted in the graphical user interface, so that when the game character is close to the bunker, it allows the player to quickly and effectively determine the location of the bunker and the specific boundaries of the bunker. At the same time, when controlling the game character to enter the bunker, it is specifically the preset type of the bunker that determines the posture behaved by the game character after entering the bunker. For the high bunker, the game character may be controlled to show a standing posture; for the low bunker, the game character may be controlled to show a non-standing posture, which may effectively ensure that the bunker is able to effectively cover the game character. At the same time, in this embodiment, when the game character is located in the occlusion area of the bunker, a series of operations such as movement, attack, and aiming of the game character in the bunker may be supported, so that the flexible operation of the game character in the occlusion area can be effectively supported, and the interactivity of the game character and the environment can be enhanced, so as to effectively restore a real tactical shooting experience in the game, and enhance the gaming experience.

The above-mentioned embodiments all introduce a series of interactions between the game character controlled by the player and the bunker. However, the game behavior of a non-player character (NPC) in current games is also relatively simple. The non-player character is generally not affected by the environment in which it is located, the behavior is relatively simple. In addition to shooting with the game character controlled by the player, the combat behavior is simple and lacks of strategy. For the problem of a single representation behavior of the non-player character, the non-player character may likewise be controlled to interact with the bunker accordingly in this embodiment, so as to effectively enhance the richness of the representation behavior of the non-player character.

The following introduces the implementation of the game control method when the game character is a non-player character, which is described in conjunction with FIG. 8. FIG. 8 is a third flowchart of the game control method provided by an embodiment of the present disclosure.

As shown in FIG. 8, the method includes the following steps.

In step S801, a respective preset probability corresponding to each of preset actions of the non-player character is acquired, where the preset actions are actions associated with the bunker.

The preset action includes at least one of the following: searching for a bunker, determining a bunker of a preset classification, moving to an occlusion area of an occlusion surface of the bunker, moving within the occlusion area, sticking a head out and attacking in the occlusion area, staying in the occlusion area, moving to another bunker, or leaving the occlusion area.

In this embodiment, for any one of the non-player characters, it may perform a plurality of preset actions for interacting with the bunker, and each preset action corresponds to a preset probability, where the preset probability refers to the probability of executing the corresponding action.

The preset action may include at least one of the following: searching for a bunker, determining a bunker of a preset classification, moving to an occlusion area of an occlusion surface of the bunker, moving within the occlusion area, sticking a head out and attacking in the occlusion area, staying in the occlusion area, moving to another bunker, or leaving the occlusion area.

The preset action in this embodiment is an action associated with the bunker. In the actual implementation procedure, in addition to the content introduced above, other implementation manners of the preset action may also be selected and set according to actual requirements. Any action associated with the bunker may be used as the preset action in this embodiment, and the specific implementation of the preset action is not limited in this embodiment.

The above-mentioned bunker of the preset classification may include, for example, a long-distance bunker and a short-distance bunker. The long-distance herein may refer to, for example, that the distance away from the current non-player character is greater than a preset distance, and the short-distance herein may refer to, for example, that the distance away from the current non-player character is smaller or equal to the preset distance.

In a possible implementation manner, for each non-player character, for example, the following Table 2 may be set:

TABLE 2

| Parameters | Meaning of the parameter | Cooling time |
|---|---|---|
| Searching for a bunker | Probability that a non-player character searches for a bunker | a |
| Determining a bunker of a preset classification | Probability that a non-player character determines a bunker of a preset classification | b |
| Entering a bunker | Probability that a non-player character moves to an occlusion area of an occlusion surface of the bunker | c |
| Shooting in the bunker | Probability that a non-player character leans out and shoots in the bunker | d |
| Moving within the bunker | Probability that a non-player character adjusts the position within the bunker | e |
| Staying in the bunker | Probability that a non-player character does not perform any behavior in the bunker | f |
| Switching the bunker | Probability that a non-player character transfers to another bunker from the bunker | g |
| Leaving the bunker and shooting | Probability that a non-player character leaves from the bunker and shoots | h |

Based on the above Table 2, it may be determined that, for any non-player character, a plurality of preset actions and the corresponding probability of each preset action may be set. In this embodiment, for each preset action, a corresponding cooling time is set, and when the non-player character performs a certain preset action, the preset action enters into cooling. The current non-player character cannot perform the preset action again until the cooling time of the preset action expires. After the cooling time has expired, the non-player character may trigger the preset action again according to the corresponding preset probability.

The cooling time for each preset action is set separately, for example, a, b, c, d, e, f, g, h in the above Table 2. For example, for the preset action "moving within the bunker", after being executed once, the preset action enters into cooling and cannot be executed again within e seconds. When e seconds are over, the action may be triggered to be executed again according to the preset probability.

In the actual implementation procedure, the preset actions that the non-player character may perform may be selected and set according to actual requirements, and any action that interacts with the bunker may be used as a preset action in this embodiment, which is not particularly limited in this embodiment. In this embodiment, the preset probability and cooling time for each preset action may also be selected and set according to actual requirements.

At the same time, for each preset action in this embodiment, the preset probability corresponding to the preset action may also be periodically updated with the preset duration as a cycle, so as to effectively increase the rationality of the execution of the preset action by the non-game player.

In step S802, the non-player character is triggered to perform the respective preset action corresponding to each of the preset probabilities according to each of the preset probabilities.

Specifically, after determining each preset probability, the non-player character then may be triggered to perform the respective preset action corresponding to each of the preset probabilities according to each of the preset probabilities.

For example, it may be determined whether to control the non-player character to search for a bunker according to the preset probability corresponding to searching for the bunker. For another example, it may be determined whether the non-player character is controlled to search for a long-distance bunker or a short-distance bunker according to the preset probability corresponding to determining the bunker of the preset classification (for example, the preset classification is a long-distance bunker). For another example, it may be determined whether to control the non-player character to move to the occlusion area of the bunker according to the preset probability corresponding to moving to the occlusion area of the occlusion surface of the bunker. The rest of the actions are similar in that they all determine whether to control the non-player character to move within the bunker, stick a head out and attack, stay, leave, move to another bunker, etc., according to the corresponding preset probability. When the non-player character intends to move to another bunker, for example, it may be determined to which specific bunker the non-player character moves based on the aforementioned preset probability.

And in a possible implementation manner, for example, when determining to control the non-player character to determine the long-distance bunker, if there are a plurality of long-distance bunkers, for example, one of the bunkers may be randomly selected, and the non-player character may be controlled to enter the occlusion area of this bunker. Alternatively, the bunker closest to the current non-player character among the plurality of long-distance bunkers may be selected, and the non-player character is controlled to enter the occlusion area of this bunker. The specific bunker to enter may be selected according to actual requirements, which is not limited in this embodiment.

In the game control method provided by the embodiments of the present disclosure, by setting a plurality of preset actions for a non-player character to interact with a bunker, and by setting a respective preset probability for each preset action, the non-player character and the bunker may be triggered to perform the corresponding preset action in accordance with the preset probability, and the interaction between the non-player character and the bunker can be effectively achieved to enhance the richness of the representation behavior of the non-player character. At the same time, the preset probability of each preset action may be updated periodically, thereby effectively improving the rationality of the representation behavior of the non-player character.

On the basis of the various embodiments described above, it needs to be further explained that there may be many objects in the current related game design, and the player may actually control the game object to move to the vicinity of the object, and use the object to cover the game character. However, in this implementation manner, in order to achieve the occlusion, the player needs to continuously adjust the behavior of the game character multiple times, but even this does not necessarily guarantee the effect of the occlusion. Therefore, the implementation manner in the related art where the player looks for an object for occluding the game character on his own is not really interacting and connecting with the bunker. In essence, it is the player who controls the game character to behave in a certain state, so it is actually a game behavior designed solely for the game character itself.

In this embodiment, the bunker control is provided to directly achieve the occlusion of the game object by the bunker, where the game object also presents a posture that may be covered without the need for multiple tedious adjustments. Moreover, the game object and the bunker in this embodiment have specific interaction and connection, which can effectively improve the interaction between the game character and the environment, and avoid the problem that the behavior of the game character is relatively simple.

Figure 9:
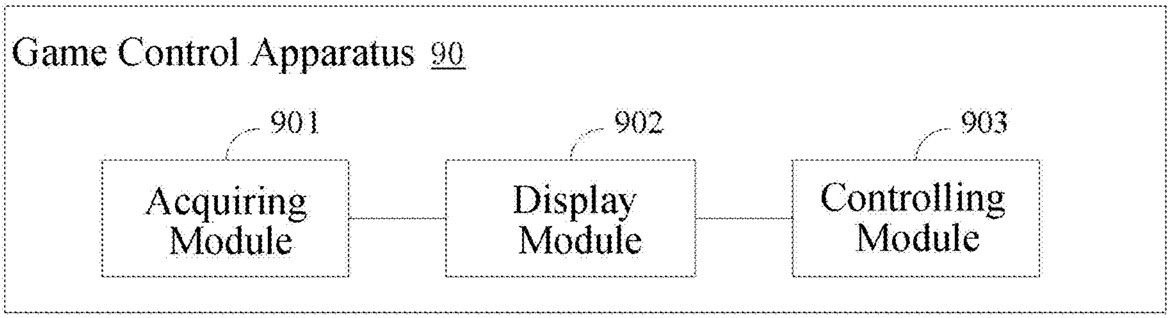
FIG. 9 is a schematic structural diagram of a game control apparatus provided by an embodiment of the present disclosure.

FIG. 9 is a schematic structural diagram of a game control apparatus provided by an embodiment of the present disclosure. As shown in FIG. 9, the apparatus 90 includes: an acquiring module 901, a display module 902, and a controlling module 903.

The acquiring module 901 is configured to perform acquiring a distance between the game character and the occlusion surface, and an included angle between an orientation of the game character and a vertical line of the occlusion surface.

The display module 902 is configured to perform, in response to the distance being less than or equal to a first preset distance and the included angle being less than or equal to a preset included angle, displaying an entering bunker control corresponding to the occlusion surface on the graphical user interface.

The controlling module 903 is configured to perform, in response to a selection operation on the entering bunker control, controlling the game character to move to an occlusion area corresponding to the occlusion surface, so that the bunker covers the game character.

In a possible design, the controlling module 903 is configured to perform:

- acquiring a preset type of the bunker, where the preset type is any one of the following: a high bunker, and a low bunker;
- determining a first posture of the game character according to the preset type of the bunker; and
- controlling the game character to move to the occlusion area corresponding to the occlusion surface, and controlling a posture of the game character to be adjusted to the first posture.

In a possible design, the controlling module 903 is configured to perform:

- in response to the preset type of the bunker being the high bunker, determining that the first posture is a standing posture;
- in response to the preset type of the bunker being the low bunker, determining that the first posture is a non-standing posture, where the non-standing posture includes a crouching posture and a prone posture.

In a possible design, the display module 902 is further configured to perform:

- in response to the distance being less than or equal to the first preset distance and the included angle being less than or equal to the preset included angle, highlighting the bunker in the graphical user interface;
- where the second preset distance is greater than the first preset distance.

In a possible design, the controlling module 903 is further configured to perform:

- after controlling the game character to move to the occlusion area corresponding to the occlusion surface, in response to an aiming operation acting on an aiming control on the graphical user interface, determining a second posture of the game character according to a preset type of the bunker; and
- controlling a posture of the game character to be adjusted to the second posture, and displaying an aiming collimator at a preset position on the graphical user interface.

In a possible design, the controlling module 903 is configured to perform:

- in response to the preset type of the bunker being the high bunker, the second posture being a posture of sticking a head out from a side of the bunker;
- in response to the preset type of the bunker being the low bunker, the second posture being a posture of sticking a head out from a top of the bunker.

In a possible design, the controlling module 903 is further configured to perform:

- after displaying the aiming collimator at the preset position on the graphical user interface, controlling the game character to perform a preset attack operation in response to a selection operation acting on an attack control on the graphical user interface.

In a possible design, the controlling module 903 is further configured to perform:

- in response to controlling the game character to move to the occlusion area corresponding to the occlusion surface, adjusting a first game perspective corresponding to a current graphical user interface to a second game perspective, where a field of view corresponding to the second game perspective is larger than a field of view corresponding to the first game perspective.

In a possible design, after controlling the game character to move to the occlusion area corresponding to the occlusion surface, the controlling module 903 is further configured to perform:

- displaying a leaving bunker control on the graphical user interface; and
- in response to a selection operation on the leaving bunker control, controlling the game character to leave the bunker, so as to cancel the bunker from occluding the game character.

In a possible design, in response to the game character being a non-player character, the controlling module 903 is further configured to perform:

- acquiring a respective preset probability corresponding to each of preset actions of the non-player character, where the preset actions are actions associated with the bunker; and
- triggering the non-player character to perform the respective preset action corresponding to each of the preset probabilities according to each of the preset probabilities.

In a possible design, the preset action includes at least one of the following: searching for a bunker, determining a bunker of a preset classification, moving to an occlusion area of an occlusion surface of the bunker, moving within the occlusion area, sticking a head out and attacking in the occlusion area, staying in the occlusion area, moving to another bunker, or leaving the occlusion area.

In a possible design, the controlling module 903 is further configured to perform:

- for any one of the preset actions, periodically updating the preset probability corresponding to the preset action using a preset duration as a cycle.

The apparatus provided in this embodiment may be used to implement the technical solutions of the above method embodiments, and the implementation principle and technical effect thereof are similar, thus will not be repeated in this embodiment.

The game control apparatus provided by the embodiments of the present disclosure acquires the distance and the included angle between the game character and the occlusion surface, and displays an entering display control corresponding to the current occlusion surface when both the distance and the included angle meet the conditions. The game character is then controlled to move to the occlusion area according to a selection operation on the entering bunker control to realize occlusion of the game character by the bunker, so that the interaction between the game character and the bunker in the game scene can be effectively realized, thereby avoiding the problem that the game character's behavior is relatively simple.

Figure 10:
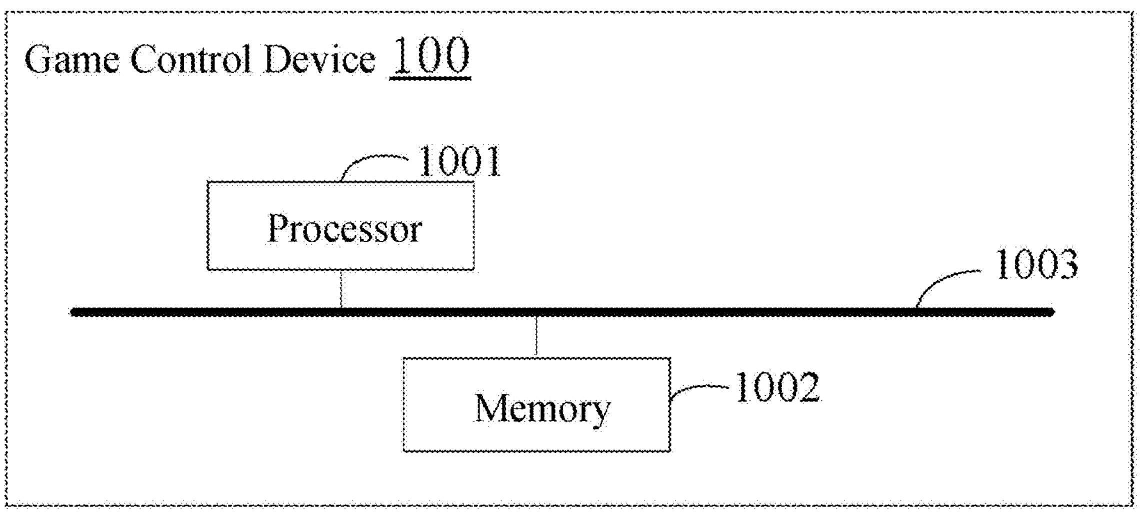
FIG. 10 is a schematic diagram of a hardware structure of a game control device provided by an embodiment of the present disclosure.

FIG. 10 is a schematic diagram of a hardware structure of a game control device provided by an embodiment of the present disclosure. As shown in FIG. 10, the game control device 100 in this embodiment includes: a processor 1001 and a memory 1002, where the memory 1002 is configured to store computer executable instructions; and the processor 1001 is configured to execute the computer executable instructions stored in the memory, so as to implement the following method steps: acquiring a distance between the game character and the occlusion surface, and an included angle between an orientation of the game character and a vertical line of the occlusion surface;

in response to the distance being less than or equal to a first preset distance and the included angle being less than or equal to a preset included angle, displaying an entering bunker control corresponding to the occlusion surface on the graphical user interface; and in response to a selection operation on the entering bunker control, controlling the game character to move to an occlusion area corresponding to the occlusion surface, so that the bunker covers the game character.

In a possible design, the controlling the game character to move to the occlusion area corresponding to the occlusion surface, includes:

acquiring a preset type of the bunker, where the preset type is any one of the following: a high bunker, and a low bunker;

determining a first posture of the game character according to the preset type of the bunker; and controlling the game character to move to the occlusion area corresponding to the occlusion surface, and controlling a posture of the game character to be adjusted to the first posture.

In a possible design, the determining the first posture of the game character according to the preset type of the bunker, includes:

in response to the preset type of the bunker being the high bunker, determining that the first posture is a standing posture;

in response to the preset type of the bunker being the low bunker, determining that the first posture is a non-standing posture, where the non-standing posture includes a crouching posture and a prone posture.

In a possible design, in response to the distance being less than or equal to the first preset distance and the included angle being less than or equal to the preset included angle, before displaying the entering bunker control corresponding to the occlusion surface on the graphical user interface, the method further includes:

in response to the distance between the game character and the occlusion surface being less than or equal to a second preset distance, highlighting the bunker in the graphical user interface;

where the second preset distance is greater than the first preset distance.

In a possible design, after controlling the game character to move to the occlusion area corresponding to the occlusion surface, the method further includes:

in response to an aiming operation acting on an aiming control on the graphical user interface, determining a second posture of the game character according to a preset type of the bunker; and controlling a posture of the game character to be adjusted to the second posture, and displaying an aiming collimator at a preset position on the graphical user interface.

In a possible design, the determining the second posture of the game character according to the preset type of the bunker, includes:

in response to the preset type of the bunker being the high bunker, the second posture being a posture of sticking a head out from a side of the bunker;

in response to the preset type of the bunker being the low bunker, the second posture being a posture of sticking a head out from a top of the bunker.

In a possible design, after displaying the aiming collimator at the preset position on the graphical user interface, the method further includes:

in response to a selection operation acting on an attack control on the graphical user interface, controlling the game character to perform a preset attack operation.

In a possible design, in response to controlling the game character to move to the occlusion area corresponding to the occlusion surface, the method further includes:

adjusting a first game perspective corresponding to a current graphical user interface to a second game perspective, where a field of view corresponding to the second game perspective is larger than a field of view corresponding to the first game perspective.

In a possible design, after controlling the game character to move to the occlusion area corresponding to the occlusion surface, the method further includes:

displaying a leaving bunker control on the graphical user interface; and in response to a selection operation on the leaving bunker control, controlling the game character to leave the bunker, so as to cancel the bunker from occluding the game character.

In a possible design, in response to the game character being a non-player character, the method further includes:

acquiring a respective preset probability corresponding to each of preset actions of the non-player character, where the preset actions are actions associated with the bunker; and triggering the non-player character to perform the respective preset action corresponding to each of the preset probabilities according to each of the preset probabilities.

In a possible design, the preset action includes at least one of the following: searching for a bunker, determining a bunker of a preset classification, moving to an occlusion area of an occlusion surface of the bunker, moving within the occlusion area, sticking a head out and attacking in the occlusion area, staying in the occlusion area, moving to another bunker, or leaving the occlusion area.

In a possible design, the method further includes:

for any one of the preset actions, periodically updating the preset probability corresponding to the preset action using a preset duration as a cycle.

Optionally, the memory 1002 may be independent or integrated with the processor 1001.

When the memory 1002 is set independently, the game control device further includes a bus 1003 for connecting the memory 1002 and the processor 1001.

An embodiment of the present disclosure further provides a computer-readable storage medium, where computer-executable instructions are stored in the computer-readable storage medium, and when the processor executes the computer-executable instructions, the following method steps are implemented:

acquiring a distance between the game character and the occlusion surface, and an included angle between an orientation of the game character and a vertical line of the occlusion surface;

in response to the distance being less than or equal to a first preset distance and the included angle being less than or equal to a preset included angle, displaying an entering bunker control corresponding to the occlusion surface on the graphical user interface; and in response to a selection operation on the entering bunker control, controlling the game character to move to an occlusion area corresponding to the occlusion surface, so that the bunker covers the game character.

In a possible design, the controlling the game character to move to the occlusion area corresponding to the occlusion surface, includes:

acquiring a preset type of the bunker, where the preset type is any one of the following: a high bunker, and a low bunker;

determining a first posture of the game character according to the preset type of the bunker; and controlling the game character to move to the occlusion area corresponding to the occlusion surface, and controlling a posture of the game character to be adjusted to the first posture.

In a possible design, the determining the first posture of the game character according to the preset type of the bunker, includes:

in response to the preset type of the bunker being the high bunker, determining that the first posture is a standing posture;

in response to the preset type of the bunker being the low bunker, determining that the first posture is a non-standing posture, where the non-standing posture includes a crouching posture and a prone posture.

In a possible design, in response to the distance being less than or equal to the first preset distance and the included angle being less than or equal to the preset included angle, before displaying the entering bunker control corresponding to the occlusion surface on the graphical user interface, the method further includes:

in response to the distance between the game character and the occlusion surface being less than or equal to a second preset distance, highlighting the bunker in the graphical user interface;

where the second preset distance is greater than the first preset distance.

In a possible design, after controlling the game character to move to the occlusion area corresponding to the occlusion surface, the method further includes:

in response to an aiming operation acting on an aiming control on the graphical user interface, determining a second posture of the game character according to a preset type of the bunker; and controlling a posture of the game character to be adjusted to the second posture, and displaying an aiming collimator at a preset position on the graphical user interface.

In a possible design, the determining the second posture of the game character according to the preset type of the bunker, includes:

in response to the preset type of the bunker being the high bunker, the second posture being a posture of sticking a head out from a side of the bunker;

in response to the preset type of the bunker being the low bunker, the second posture being a posture of sticking a head out from a top of the bunker.

In a possible design, after displaying the aiming collimator at the preset position on the graphical user interface, the method further includes:

in response to a selection operation acting on an attack control on the graphical user interface, controlling the game character to perform a preset attack operation.

In a possible design, in response to controlling the game character to move to the occlusion area corresponding to the occlusion surface, the method further includes:

adjusting a first game perspective corresponding to a current graphical user interface to a second game perspective, where a field of view corresponding to the second game perspective is larger than a field of view corresponding to the first game perspective.

In a possible design, after controlling the game character to move to the occlusion area corresponding to the occlusion surface, the method further includes:

displaying a leaving bunker control on the graphical user interface; and in response to a selection operation on the leaving bunker control, controlling the game character to leave the bunker, so as to cancel the bunker from occluding the game character.

In a possible design, in response to the game character being a non-player character, the method further includes:

acquiring a respective preset probability corresponding to each of preset actions of the non-player character, where the preset actions are actions associated with the bunker; and triggering the non-player character to perform the respective preset action corresponding to each of the preset probabilities according to each of the preset probabilities.

In a possible design, the preset action includes at least one of the following: searching for a bunker, determining a bunker of a preset classification, moving to an occlusion area of an occlusion surface of the bunker, moving within the occlusion area, sticking a head out and attacking in the occlusion area, staying in the occlusion area, moving to another bunker, or leaving the occlusion area.

In a possible design, the method further includes:

for any one of the preset actions, periodically updating the preset probability corresponding to the preset action using a preset duration as a cycle.

In the several embodiments provided in the present disclosure, it should be understood that the disclosed devices and methods may be implemented in other ways. For example, the device embodiments described above are only illustrative. For example, the division of the described modules is merely a logical functional division, and other division manners may be adopted in actual implementation, e.g., multiple modules may be combined or may be integrated into another system, or some features may be ignored, or not implemented. In addition, the mutual coupling or direct coupling or communication connection shown or discussed may be through some interfaces, and the indirect coupling or communication connection of devices or modules may be electrical, mechanical or in other forms.

The aforementioned integrated modules implemented in the form of software functional modules may be stored in a computer-readable storage medium. The aforementioned software functional modules are stored in a storage medium, including several instructions to enable a computer device (which may be a personal computer, a server, or a network device, etc.) or a processor to execute part of the steps of the methods described in the various embodiments of the present disclosure.

It should be understood that the aforementioned processor may be a Central Processing Unit (CPU), and may also be other general-purpose processors, a Digital Signal Processor (DSP), an Application Specific Integrated Circuit (ASIC) and so on. The general-purpose processor may be a microprocessor, or the processor may be any conventional processor, etc. The steps of the method disclosed in conjunction with the present disclosure may be directly implemented as executed by a hardware processor, or a combination of hardware and software modules in the processor.

The memory may include a high-speed RAM memory, and may also include a non-volatile memory (NVM), such as at least one disk storage, and may also be a U disk, a mobile hard disk, a read-only memory, a magnetic disk, or an optical disk.

The bus may be an Industry Standard Architecture (ISA) bus, a Peripheral Component Interconnect (PCI) bus, or an Extended Industry Standard Architecture (EISA) bus, etc. The bus may be categorized as an address bus, a data bus, a control bus, etc. For ease of representation, the buses in the drawings of the present disclosure are not limited to only one bus or one type of bus.

The aforementioned storage medium may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or an optical disk. The storage medium may be any available medium that may be accessed by a general-purpose or specialized computer.

Those of ordinary skill in the art may understand that all or part of the steps for implementing the above method embodiments may be completed by hardware related to program instructions. The aforementioned program may be stored in a computer-readable storage medium. When the program is executed, the steps included in the above various method embodiments are executed, and the aforementioned storage medium includes: a ROM, a RAM, a magnetic disk or an optical disk and other various media that may store program codes.

Finally, it should be noted that: the above embodiments are only used to illustrate the technical solutions of the present disclosure, rather than to limit them. Although the present disclosure has been described in detail with reference to the foregoing embodiments, those of ordinary skill in the art should understand that the technical solutions described in the foregoing embodiments may still be modified, or some or all of the technical features therein may be equivalently replaced. These modifications or replacements do not make the essence of the corresponding technical solutions depart from the scope of the technical solutions of the embodiments of the present disclosure.

What is claimed is:

1. A game control method, comprising:

acquiring a distance between a game character and an occlusion surface of a bunker, and an included angle between an orientation of the game character and a vertical line of the occlusion surface;

in response to determining the distance is less than or equal to a first preset distance and the included angle is less than or equal to a preset included angle, displaying an entering bunker control corresponding to the occlusion surface on a graphical user interface; and in response to detecting a selection operation on the entering bunker control, controlling the game character to move to an occlusion area corresponding to the occlusion surface, wherein the bunker covers the game character.

2. The method according to claim 1, wherein controlling the game character to move to the occlusion area corresponding to the occlusion surface comprises:

acquiring a preset type of the bunker, wherein the preset type comprises: a high bunker, and a low bunker;

determining a first posture of the game character according to the preset type of the bunker; and controlling the game character to move to the occlusion area corresponding to the occlusion surface, and controlling a posture of the game character to be adjusted to the first posture.

3. The method according to claim 2, wherein determining the first posture of the game character according to the preset type of the bunker, comprises:

in response to determining the preset type of the bunker is the high bunker, determining that the first posture is a standing posture;

in response to determining the preset type of the bunker is the low bunker, determining that the first posture is a non-standing posture, wherein the non-standing posture comprises a crouching posture and a prone posture.

4. The method according to claim 1, wherein in response to determining the distance is less than or equal to the first preset distance and the included angle is less than or equal to the preset included angle, the method further comprises:

in response to determining the distance between the game character and the occlusion surface is less than or equal to a second preset distance, highlighting the bunker in the graphical user interface;

wherein the second preset distance is greater than the first preset distance.

5. The game control method according to claim 4, wherein highlighting the bunker in the graphical user interface comprises: displaying the bunker with a relatively high brightness in the graphical user interface; or displaying a frame line in the graphical user interface, wherein the bunker is located within the frame line; or displaying a bunker label on the bunker in the graphical user interface.

6. The method according to claim 1, wherein the method further comprises:

in response to detecting an aiming operation acting on an aiming control on the graphical user interface, determining a second posture of the game character according to a preset type of the bunker; and controlling a posture of the game character to be adjusted to the second posture, and displaying an aiming collimator at a preset position on the graphical user interface.

7. The method according to claim 6, wherein determining the second posture of the game character according to the preset type of the bunker, comprises:

in response to determining the preset type of the bunker is a high bunker, determining the second posture as a posture of sticking a head out from a side of the bunker;

in response to determining the preset type of the bunker is a low bunker, determining the second posture as a posture of sticking a head out from a top of the bunker.

8. The method according to claim 6, wherein the method further comprises:

in response to detecting a selection operation acting on an attack control on the graphical user interface, controlling the game character to perform a preset attack operation.

9. The method according to claim 1, wherein in response to controlling the game character to move to the occlusion area corresponding to the occlusion surface, the method further comprises:

adjusting a first game perspective corresponding to a current graphical user interface to a second game perspective, wherein a field of view corresponding to the second game perspective is larger than a field of view corresponding to the first game perspective.

10. The method according to claim 1, wherein the method further comprises:

displaying a leaving bunker control on the graphical user interface; and in response to detecting a selection operation on the leaving bunker control, controlling the game character to leave the bunker, so as to cancel the bunker from occluding the game character.

11. The method according to claim 1, wherein in response to determining the game character is a non-player character, the method further comprises:

acquiring a respective preset probability corresponding to each of preset actions of the non-player character, wherein the preset actions are actions associated with the bunker; and triggering the non-player character to perform the respective preset action corresponding to each of the preset probabilities according to each of the preset probabilities.

12. The method according to claim 11, wherein the preset action comprises at least one of: searching for a bunker, determining a bunker of a preset classification, moving to an occlusion area of a bunker surface of the bunker, moving within the occlusion area, sticking a head out and attacking in the occlusion area, staying in the occlusion area, moving to another bunker, or leaving the occlusion area.

13. The method according to claim 11, wherein the method further comprises:

for any one of the preset actions, periodically updating the preset probability corresponding to the preset action using a preset duration as a cycle.

14. The game control method according to claim 1, wherein the graphical user interface is obtained by executing a game application and rendering on a display of a terminal device, the graphical user interface comprises at least a part of a game scene, and the game scene comprises the game character and the bunker.

15. The game control method according to claim 1, wherein the distance between the game character and the occlusion surface of the bunker is acquired in real time, or is acquired periodically with a preset duration as a cycle, or is acquired each time a movement of the game character is detected.

16. The game control method according to claim 1, wherein the method further comprises:

in response to detecting a movement operation acting on a movement control, controlling a movement of the game character in the occlusion area of the bunker surface.

17. The game control method according to claim 1, wherein the method further comprises:

enlarging a range of a game field of view displayed in the graphical user interface.

18. The game control method according to claim 1, wherein the method further comprises:

controlling the game character to leave the bunker in response to determining the game character is located on a side edge or upper edge of a bunker surface of the bunker and the included angle is greater than the preset included angle, and detecting a movement operation of the game character towards a same direction as the side edge or upper edge.

19. A game control device, comprising:

a memory, configured to store a program; and a processor, configured to execute the program stored in the memory, wherein when the program is executed, the processor is configured to perform:

acquiring a distance between a game character and an occlusion surface of a bunker, and an included angle between an orientation of the game character and a vertical line of the occlusion surface;

in response to determining the distance is less than or equal to a first preset distance and the included angle is less than or equal to a preset included angle, displaying an entering bunker control corresponding to the occlusion surface on a graphical user interface; and in response to detecting a selection operation on the entering bunker control, controlling the game character to move to an occlusion area corresponding to the occlusion surface, wherein the bunker covers the game character.

20. A non-transitory computer-readable storage medium, comprising instructions, wherein the instructions, when being run on a computer, cause the computer to perform:

acquiring a distance between a game character and an occlusion surface of a bunker, and an included angle between an orientation of the game character and a vertical line of the occlusion surface;

in response to determining the distance is less than or equal to a first preset distance and the included angle is less than or equal to a preset included angle, displaying an entering bunker control corresponding to the occlusion surface on a graphical user interface; and in response to detecting a selection operation on the entering bunker control, controlling the game character to move to an occlusion area corresponding to the occlusion surface, wherein the bunker covers the game character.

* * * * *